No. 778,786. PATENTED DEC. 27, 1904.
J. A. KRAMER.
CLIP FOR FLOWER POTS.
APPLICATION FILED MAR. 9, 1903.
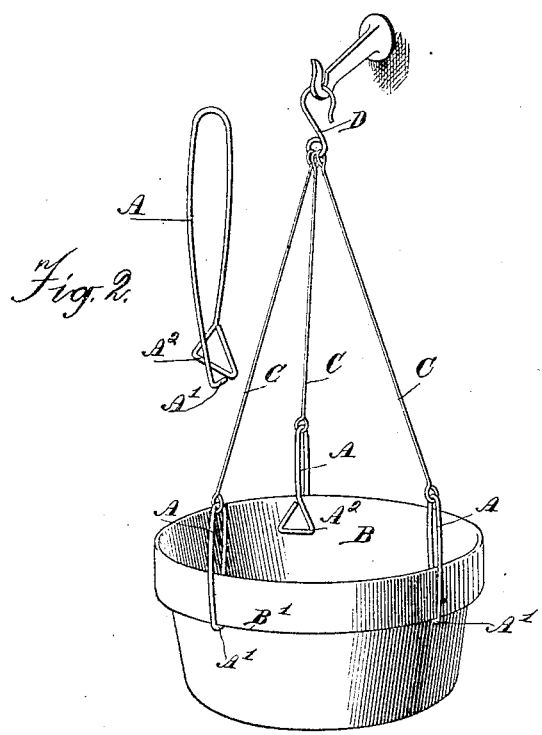
Witnesses
J. H. Groat.
L. A. St. John.
Inventor
Judson A. Kramer.
By J. M. St. John
Atty.

No. 778,786. Patented December 27, 1904.

UNITED STATES PATENT OFFICE.

JUDSON A. KRAMER, OF MARION, IOWA.

CLIP FOR FLOWER-POTS.

SPECIFICATION forming part of Letters Patent No. 778,786, dated December 27, 1904.

Application filed March 9, 1903. Serial No. 146,873.

*To all whom it may concern:*

Be it known that I, JUDSON A. KRAMER, a citizen of the United States, residing at Marion, in the county of Linn and State of Iowa, have invented certain new and useful Improvements in Clips for Flower-Pots, of which the following is a specification.

The object of this invention is to produce a cheap, simple, and efficient wire clip for suspending flower-pots or other vessels of analogous character.

The nature of the invention will clearly appear from the description and claims following, reference being had to the accompanying drawings, in which—

Figure 1 is a view in perspective, illustrating the device as applied to a flower-pot. Fig. 2 is a view of one of the clips detached.

The clip is composed of a single piece of wire more or less elastic and preferably, though not necessarily, galvanized. The main body of the clip A is in the nature of a loop or stirrup with the ends normally in contact, so as to pinch the rim of the pot B, placed between them. One member of the loop is bent inwardly at A' at practically a right angle, so as to engage the shoulder B' of the pot-rim. The other is bent into an eye A², preferably triangular, as shown. When in position, the lower angles bear at two points on the curved inner surface of the pot, and thus tend to prevent accidental twisting of the clip sidewise. Both legs of the clip bow outwardly, so that the clip makes strong contact with the pot at only three points—the angles of the eye on one side (the inside) and the single tang on the outside nearly opposite. This curvature also admits of considerable variation in the movement of the clip radially with respect to the pot, and for this reason quite short suspending-links C may be used without detaching the outer tang from the pot-rim.

In practice three of the clips are generally used on a pot, with links C attached and connecting with a suspending hook or ring D.

Having thus described my invention, what I claim as new, and desire to secure by Letters Patent, is—

1. A clip for flower-pots and the like, comprising a looped body with outwardly-curved members adapted to press toward each other at the free ends elastically, one such member terminating in an inwardly-projecting tang, and the other in an angular eye presenting two points of contact with the inner surface of the pot.

2. The combination of the described clip comprising a looped body, the elastic members of which are adapted to pinch the pot-rim when placed between them, one such member terminating in an inwardly-projecting tang and the other in an angular eye, a link connecting with the loop of said clip, and a suspending-hook at the other end of the link.

In testimony whereof I affix my signature in presence of two witnesses.

JUDSON A. KRAMER.

Witnesses:
J. M. ST. JOHN,
LOLA A. ST. JOHN.